Sept. 1, 1970   HANS-JOACHIM HENKEL ET AL   3,526,771
APPARATUS FOR CONTROLLING THE CONCENTRATION OF A LIQUID SOLUTION
Filed May 24, 1968
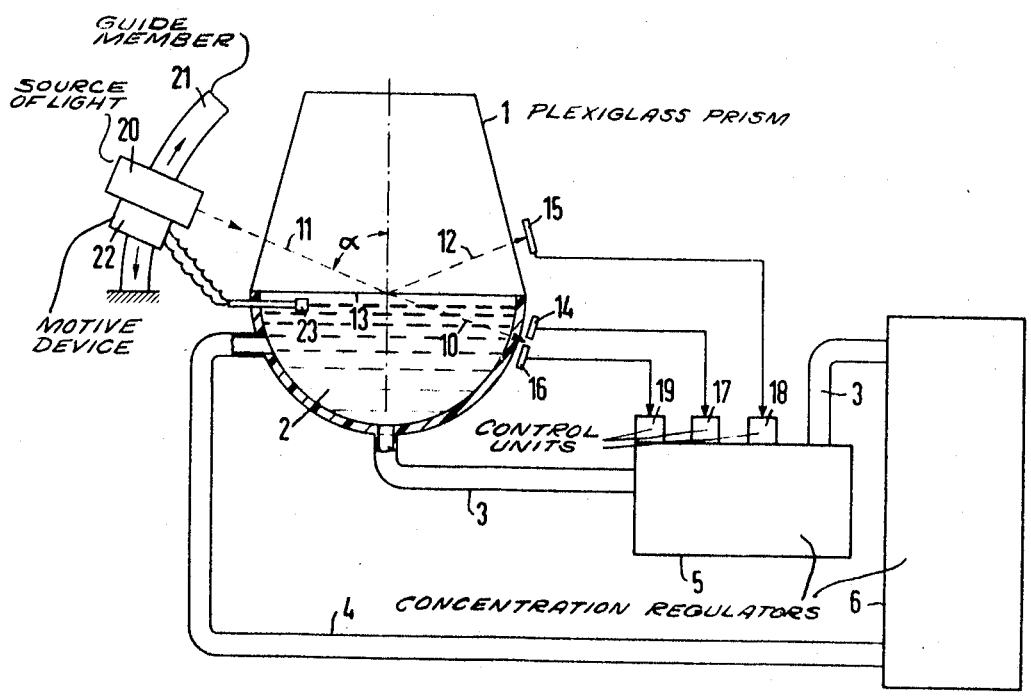

United States Patent Office
3,526,771
Patented Sept. 1, 1970

3,526,771
APPARATUS FOR CONTROLLING THE CONCENTRATION OF A LIQUID SOLUTION
Hans-Joachim Henkel, Erlangen, and Friedrich Kozdon, Erlangen-Buckenhof, Germany, assignors to Siemens Aktiengesellschaft, a corporation of Germany
Filed May 24, 1968, Ser. No. 731,780
Claims priority, application Germany, May 26, 1967, S 110,017
Int. Cl. G01n 21/46
U.S. Cl. 250—218                    13 Claims

ABSTRACT OF THE DISCLOSURE

A source of light movably mounted adjacent a prism and a test solution having a common surface provides a beam of light with variable angle of incidence relative to the common surface. The source of light is positioned to direct a beam of light through the prism to the common surface. Photoelectric transducer apparatus positioned in operative proximity with the prism and the test solution controls the concentration of the test solution via a concentration regulator by supplying to the concentration regulator electrical control signals corresponding to predetermined angles of refraction of light passing through the prism and the test solution and to a determined angle of reflection of light passing through the prism.

DESCRIPTION OF THE INVENTION

The present invention relates to apparatus for controlling the concentration of a liquid solution. More particularly, our invention relates to controlling the concentration of a liquid solution by indicating the angle of refraction therethrough.

Apparatus is known for measuring the angular limit of total reflection in order to determine the index of refraction of a liquid. The liquid is penetrated by a light beam which first penetrates an optical component such as, for example, glass, having a determined index of refraction. Apparatus of this type is subject to inaccuracies due to agitation, jarring or vibration thereof.

The principal object of the present invention is to provide a new and improved apparatus for controlling the concentration of a liquid solution.

An object of the present invention is to provide apparatus for controlling the concentratoin of a liquid solution, which apparatus overcomes the disadvantages of known apparatus of this type.

An object of the present invention is to provide apparatus for controlling the concentration of a liquid solution, which apparatus is of simple structure and provides accurate, reliable and efficient results, regardless of vibration or the like.

An object of the present invention is to provide apparatus for controlling the concentration of a liquid solution, which apparatus utilizes the phenomenon of total reflection at the test solution for the purpose of measuring and controlling the concentration of said test solution.

In accordance with our invention, apparatus for controlling the concentration of a liquid solution comprises a transparent container containing a test solution the concentration of which is to be controlled. The test solution has an index of refraction and a surface. A total reflecting prism is positioned on the container on the surface of the test solution. The prism has a greater index of refraction than the test solution and has a total reflecting beam path at the common surface of the test solution and the prism. A source of light is movable mounted adjacent the prism and the container for providing a beam of light with a variable angle of incidence relative to the common surface of the prism and the test solution. The angle of incidence may be adjusted so that it is smaller within a permissible range of error relative to smaller concentrations than the angle of total reflection. The source of light is positioned to direct a beam of light through the prism to the common surface. A concentration regulator is coupled to the container via ducts for regulating the concentration of the test solution. The concentration regulator includes a control for operating the concentration regulator to concentrate and deconcentrate the test solution in accordance with an electrical signal supplied thereto. Photoelectric transducer apparatus is positioned in operative proximity with the prism and the container and is electrically connected to the control of the concentration regulator and supplies to the concentration regulator electrical control signals corresponding to predetermined angles of refraction of light passing through the prism and the test solution and to a predetermined angle of reflection of light passing through the prism for controlling the concentration of the test solution.

The photoelectric transducer apparatus comprises a plurality of photosensitive components positioned in predetermined refracting beam paths adjacent the container corresponding to different concentrations of the test solution and a photosensitive component positioned in the total reflecting beam path of the prism adjacent the prism. One of the photosensitive components is positioned in a refracting beam path adjacent the container corresponding to the greatest permissible concentration of the test solution.

The ratio of the index of refraction of the prism to the index of refraction of the test solution depends upon the temperature in a predetermined temperature range. A temperature responsive component is coupled to the source of light to move the source of light to vary the angle of incidence of the beam of light to compensate for temperature dependence of the ratio of the indices of refraction of the prism and the test solution. The temperature responsive component comprises a bimetal strip. The test solution may comprise an electrolytic solution such as an alkaline electrolyte and the prism may comprise Plexiglas.

In order that the present invention may be readily carried into effect, it will now be described with reference to the accompanying drawing, wherein the single figure is a schematic diagram of an embodiment of the apparatus of the present invention for controlling the concentration of a liquid solution.

In the figure, a Plexiglas prism 1 is positioned on the surface of a test solution contained in a transparent container 2. The prism 1 forms a common surface with the test solution. The refraction index $n_1$ of the prism 1 is greater than the refraction index $n_2$ of the test solution, in the entire concentration range of said test solution.

In accordance with the present invention, the concentration of the test solution is determined by a determination of the index of refraction of a beam of light passing through the prism 1 and said test solution. The index of refraction is converted to an electrical signal which corresponds thereto and such electrical signal is utilized to control a concentration regulator which controls the concentration of the test solution.

A concentration regulator 5 and/or 6 is coupled to the container 2 via ducts 3 and 4. The duct 3 leads to an outlet of the container 2 and the duct 4 leads to an inlet of said container. The concentration regulator 5 includes control units 17, 18 and 19 which operate said concentration regulator to concentrate and deconcentrate the test solution in accordance with an electrical signal supplied thereto. The concentration regulator, as such, is known and its operation in concentrating and deconcentrating the test solution is also known. The concentration regulator 5 may comprise, for example, a storage tank and a pump.

The device 6 may comprise, for example, a fuel cell having an electrolytic concentration which is controlled or regulated in accordance with the present invention.

A source of light 20 is movably mounted adjacent the prism 1 and the container 2 and provides a beam of light 11 with a variable angle of incidence relative to the common surface 13 of the prism and the test solution. The light source 20 is thus mounted on a guide member 21, for example, and is moved by a suitable motive device 22 which is adapted to move along said member in either direction, as indicated by the arrows on said member, under the control of an electrical current. The movement of the light source 20 may be motivated by the temperature of the test solution. In such case a thermal or heat responsive or temperature sensitive component 23 such as, for example, a bimetal strap, is inserted in the test solution and provides an electrical control signal which, after suitable amplification, controls the motive device 22. The temperature of the prism 1, or other temperature, may be utilized to control the movement of the light source 20 along the member 21. The temperature control thus provides a reference or datum value control. The movement of the source of light 20 thus varies the angle of incidence of the beam of light 11 to compensate for temperature dependence of the ratio of the index of refraction $n_1$ of the prism 1 and the index of refraction $n_2$ of the test solution. The beam of light 11 is directed through the prism 1 to the common surface 13.

In order to provide operation which is independent of temperature, the material selected for the prism 1 preferably has an index of refraction $n_1$ which is such that the ratio of the index of refraction $n_1$ of said prism to the index of refraction $n_2$ of the test solution is independent of temperature in the operating temperature range. The temperature compensating arrangement, by which the position of the light source 20 is controlled in accordance with temperature is an additional means for overcoming any temperature dependence which may exist, since it is a temperature compensating arrangement.

In accordance with our invention, the concentration of the test solution is controlled or regulated by comparing the refraction index $n_2$ of the test solution with the known refraction index $n_1$ of the prism 1. This is due to the fact that the index of refraction of the test solution in the container 2 varies with the concentration of said test solution. When the concentration of the test solution varies, the refracted light beam 10 varies in so far as its angle of refraction is concerned. The light beam 11 is directed toward the common surface 13 at an angle of incidence α. If the light beam 11 is totally reflected by the common surface 13, the reflected light beam 12 is produced at the opposite side of the prism 1. If the light beam 11 is refracted by the test solution, the refracted light beam 10 is produced outside the container 2.

The angle of incidence α of the light beam 11 is adjusted in a manner whereby at the desired, reference or datum value concentration of the test solution, said light beam is refracted in the test solution and is not totally reflected by the common surface. At a concentration of the test solution which is greater than the desired or reference value, the light beam 11 is refracted at an angle α with the vertical which is less than the angle of refraction when the concentration has the desired or reference value. When the concentration of the test solution is less than the desired or reference value, the light beam 11 is totally reflected at the common surface 13. In such case, the reflected light beam 12 is provided at the side of the prism 1 which is opposite that at which the light beam 11 entered.

A photoelectric transducer 14 of any suitable type such as, for example, a photosensitive component such as a phototransistor, photoresistor, or the like, is positioned in a predetermined refracting beam path adjacent the container 2 and corresponding to an acceptable, desirable or reference valued concentration of the test solution. Another photoelectric transducer 15, which may be identical with the transducer 14, is positioned in the total reflecting beam path 12 of the prism 1 adjacent said prism corresponding to a concentration of the test solution which is less than the desired or reference valued concentration thereof. Still another photoelectric transducer 16, which may be identical with each of the transducers 14 and 15, is positioned in another predetermined refracting beam path adjacent the container 2 corresponding to a concentration of the test solution which is greater than the desired concentration thereof.

In the operation of the apparatus of the figure, when the concentration of the test solution in the container 2 is less than a desired or reference value, the light beam 11 is totally reflected by the common surface 13 and the reflected light beam 12 impinges upon the photoelectric transducer 15. When the concentration of the test solution in the container 2 is greater than the desired or reference value, the light beam 11 is refracted at the common surface 13 and the refracted light beam 10 impinges upon the photoelectric transducer 16. When the concentration of the test solution is within a predetermined desired or reference range, the light beam 11 is refracted at the common surface 13 and the refracted light beam 10 impinges upon the photoelectric transducer 14 or any other similar transducer positioned between said common surface and the photoelectric transducer 16. Although three transducers are indicated, any suitable number thereof may, of course, be utilized.

The photosensitive component 14 is electrically connected to the control unit 17 of the concentration regulator 5. The photosensitive component 15 is electrically connected to the control unit 18 of the concentration regulator 5. The photosensitive component 16 is connected to the control unit 19 of the concentration regulator 5. When the light beam impinges upon one of the photosensitive components 14, 15 and 16, said component either produces an electrical signal or varies an electrical signal, depending upon what type of component is utilized, and the electrical signal is supplied to the corresponding one of the control units 17, 18 and 19, respectively. When the component 14 is irradiated by a light beam, the electrical signal determined by it is supplied to the control unit 17 which does not operate the concentration regulator 5. When the component 15 is irradiated by a reflected light beam 12, the electrical signal effected by it is supplied to the control unit 18. The control unit 18 then controls the operation of the concentration regulator 5 to increase the concentration of the test solution in the container 2. When the component 16 is irradiated by the refracted light 10, the electrical signal effected by it is supplied to the control unit 19. The control unit 19 then controls the operation of the concentration regulator to decrease the concentration of the test solution in the container 2. The concentration of the test solution may be increased by adding the material which the solution comprises and said concentration may be decreased by diluting said solution by adding more liquid or water.

The angle of incidence α of the light beam 11 may be adjusted so that it is smaller within a permissible range of error relative to smaller concentrations than the angle of total reflection. The test solution may comprise an electrolytic solution and such electrolytic solution may be the electrolyte of a fuel cell. In such case, the apparatus of the present invention controls or regulates the concentration of the electrolyte of the fuel cell. The electrolyte may comprise an alkaline electrolyte. The prism 1 is preferably of Plexiglas, which is alkali proof, when the electrolyte is an alkaline electrolyte. Otherwise, the prism 1 may comprise any suitable material.

While the invention has been described by means of a specific example and in a specific embodiment, we do not wish to be limited thereto for obvious modifications may occur to those skilled in the art without departing from the spirit and scope of the invention.

We claim:

1. Apparatus for controlling the concentration of a liquid solution, comprising
    transparent container means containing a test solution the concentration of which is to be controlled, said test solution having an index of refraction and a surface;
    a total reflecting prism positioned on said container means on the surface of said test solution, said prism having a greater index of refraction than said test solution and having a total reflecting beam path at the common surface of said test solution and said prism;
    a source of light movably mounted adjacent said prism and said container means for providing a beam of light with a variable angle of incidence relative to the common surface of said prism and said test solution in a manner whereby the angle of incidence may be adjusted so that it is smaller within a permissible range of error relative to smaller concentrations than the angle of total reflection, said source of light being positioned to direct beam of light through said prism to said common surface;
    concentration regulating means coupled to said container means via ducts for regulating the concentration of said test solution, said concentration regulating means including control means for operating said concentration regulating means to concentrate and deconcentrate said test solution in accordance with an electrical signal supplied thereto; and
    photoelectric transducer means positioned in operative proximity with said prism and said container means and electrically connected to the control means of said concentration regulating means for supplying to said concentration regulating means electrical control signals corresponding to predetermined angles of refraction of light passing through said prism and said test solution and to a predetermined angle of reflection of light passing through said prism for controlling the concentration of said test solution.

2. Apparatus as claimed in claim 1, wherein said photoelectric transducer means comprises a plurality of spaced photosensitive components positioned in predetermined refracting beam paths adjacent said container means corresponding to different concentrations of said test solution.

3. Apparatus as claimed in claim 1, wherein said photoelectric transducer means comprises a photosensitive component positioned in the total reflecting beam path of said prism adjacent said prism.

4. Apparatus as claimed in claim 1, wherein said photoelectric transducer means comprises a plurality of spaced photosensitive components positioned in predetermined refracting beam paths adjacent said container means corresponding to different concentrations of said test solution and a photosensitive component positioned in the total reflecting beam path of said prism adjacent said prism.

5. Apparatus as claimed in claim 1, wherein said photoelectric transducer means comprises a plurality of spaced photosensitive components positioned in predetermined refracting beam paths adjacent said container means corresponding to different concentrations of said test solution and a photosensitive component positioned in the total reflecting beam path of said prism adjacent said prism, one of said photosensitive components being positioned in a refracting beam path adjacent said container means corresponding to the greatest permissible concentration of said test solution.

6. Apparatus as claimed in claim 1, further comprising temperature responsive means coupled to said source of light to move said source of light to vary the angle of incidence of said beam of light to compensate for temperature dependence of the ratio of the indices of refraction of said prism and said test solution.

7. Apparatus as claimed in claim 1, wherein said test solution is an electrolytic solution.

8. Apparatus as claimed in claim 1, wherein said prism comprises Plexiglas and said test solution comprises an alkaline electrolyte.

9. Apparatus as claimed in claim 5, wherein the ratio of the index of refraction of said prism to the index of refraction of said test solution depends upon the temperature in a predetermined temperature range.

10. Apparatus as claimed in claim 5, further comprising temperature responsive means coupled to said source of light to move said source of light to vary the angle of incidence of said beam of light to compensate for temperature dependence of the ratio of the indices of refraction of said prism and said test solution.

11. Apparatus as claimed in claim 5, wherein said test solution is an electrolytic solution.

12. Apparatus as claimed in claim 5, wherein said prism comprises Plexiglas and said test solution comprises an alkaline electrolyte.

13. Apparatus as claimed in claim 7, wherein said temperature responsive means comprises a bimetal strip.

References Cited

UNITED STATES PATENTS

| | | | |
|---|---|---|---|
| 2,780,131 | 2/1957 | Lanneau et al. | 250—218 X |
| 2,807,976 | 10/1957 | Vossberg | 356—136 |
| 3,449,051 | 6/1969 | Levitt | 356—134 X |

WALTER STOLWEIN, Primary Examiner

U.S. Cl. X.R.

356—135